United States Patent
Manowitz et al.

(10) Patent No.: US 7,468,751 B2
(45) Date of Patent: *Dec. 23, 2008

(54) DEVICES AND METHODS FOR PROCESSING DIGITAL IMAGE DATA COMPATIBLE WITH A TELEVISION RECEIVER

(75) Inventors: Neal Manowitz, Burlingame, CA (US); Eric D. Edwards, Ringwood, NJ (US)

(73) Assignee: Sony Corporation, Tokyo (JP)

( * ) Notice: Subject to any disclaimer, the term of this patent is extended or adjusted under 35 U.S.C. 154(b) by 826 days.

This patent is subject to a terminal disclaimer.

(21) Appl. No.: 10/608,539

(22) Filed: Jun. 30, 2003

(65) Prior Publication Data

US 2004/0090541 A1     May 13, 2004

Related U.S. Application Data

(63) Continuation of application No. 09/258,074, filed on Feb. 26, 1999, now Pat. No. 6,614,470.

(51) Int. Cl.
*H04N 5/222* (2006.01)
(52) U.S. Cl. .................. 348/333.01; 348/239
(58) Field of Classification Search . 348/211.2–211.14, 348/735, 152, 375
See application file for complete search history.

(56) References Cited

U.S. PATENT DOCUMENTS

| | | |
|---|---|---|
| 5,132,992 A | 7/1992 | Yurt et al. |
| 5,537,157 A | 7/1996 | Washino et al. |
| 5,619,250 A | 4/1997 | McClellan |
| 5,721,815 A | 2/1998 | Ottesen et al. |
| 5,768,539 A | 6/1998 | Metz |
| 5,781,228 A | 7/1998 | Sposato |
| 5,806,005 A | 9/1998 | Hull et al. |
| 5,808,660 A | 9/1998 | Sekine et al. |
| 5,818,439 A | 10/1998 | Nagasaka et al. |
| 5,819,004 A | 10/1998 | Azadegan et al. |
| 5,845,166 A | 12/1998 | Fellegara et al. |

(Continued)

OTHER PUBLICATIONS

PCT International Search Report, mailing date May 30, 2000.

*Primary Examiner*—Tuan V Ho
(74) *Attorney, Agent, or Firm*—Finnegan, Henderson, Farabow, Garrett & Dunner, L.L.P.

(57) ABSTRACT

A method for processing digital images and displaying them on a television receiver is provided. Initially, an image processing device receives digital image data from a digital camera or other digital device. Next, the digital image is stored on a storage device associated with the image processing device. This digital image on the storage device is converted into television signals and supplied to a television receiver where it can be displayed. Another aspect of the present invention provides an apparatus for processing these images. This apparatus includes a first input terminal capable of receiving digital image data, a second input terminal capable of receiving commands from a user, an output terminal capable of supplying digital image data to a television receiver external to the apparatus, a storage device associated with the apparatus capable of storing the digital image data, and a processor capable of executing instructions in response to commands received over the second input terminal that store the received digital image in the storage device, converts the digital images into television signals, and transmit the television signals to the television receiver for display thereon.

68 Claims, 3 Drawing Sheets

U.S. PATENT DOCUMENTS

| | | |
|---|---|---|
| 5,854,591 A | 12/1998 | Atkinson |
| 5,936,679 A | 8/1999 | Kasahara et al. |
| 5,973,722 A | 10/1999 | Wakai et al. |
| 6,014,381 A | 1/2000 | Troxel et al. |
| 6,046,760 A | 4/2000 | Jun |
| 6,049,823 A | 4/2000 | Hwang |
| 6,072,521 A | 6/2000 | Harrison et al. |
| 6,118,486 A | 9/2000 | Reitmeier |
| 6,154,633 A | 11/2000 | Landgraf |
| 6,157,377 A | 12/2000 | Shah-Nazaroff et al. |
| 6,285,371 B1 | 9/2001 | Gould et al. |
| 6,381,747 B1 | 4/2002 | Wonfor et al. |
| 6,452,923 B1 | 9/2002 | Gerszberg et al. |
| 6,532,593 B1 | 3/2003 | Moroney |

DEVICES AND METHODS FOR PROCESSING DIGITAL IMAGE DATA COMPATIBLE WITH A TELEVISION RECEIVER

This is a continuation of application Ser. No. 09/258,074, filed Feb. 26, 1999 now U.S. Pat. No. 6,614,470 which is incorporated herein by reference.

TECHNICAL FIELD

This invention generally relates to digital image processing and more particularly, to an image processing device and method compatible with a television receiver.

DESCRIPTION OF THE RELATED ART

Increased availability of digital cameras has popularized digital photography and digital images. Unlike traditional photographs, users can immediately display these digital images on a suitable display device without the need for expensive and complex chemical processes. Typically, the digital camera captures the digital images on a storage device that uploads images to a computer for display on a computer monitor. To receive the digital images for uploading, the computer may require a special communication interface and corresponding software to communicate with the digital camera. The computer may also require special software to display the digital images on a display device.

Unfortunately, without such specially equipped computers digitally photography can be quite difficult. The digital camera may not communicate properly with a computer lacking the proper communications interface and corresponding software.

Once uploaded, special software capable of processing these digital images may be necessary for the images to be viewed and enjoyed on a computer. The processing may include a variety of proprietary compression and image processing routines unique to the digital image, the digital camera, or both. Consequently, incompatible software or software without these features may render the images difficult for others to view and enjoy. For example, an image may be viewed on a computer at work but may not be viewed at home because a home computer does not have the proper software and processing capabilities. Moreover, for people without a computer or computer skills, digital photography may not even be a viable option to the traditional photography requiring additional chemical processing and corresponding costs.

Accordingly, there is a need to create an apparatus and methods that receive and display digital images in a more convenient manner using a display device such as a television.

DISCLOSURE OF THE INVENTION

In accordance with the present invention, as embodied and broadly described herein, a method for processing digital images and displaying them on a television receiver is provided. Initially, an image processing device receives digital image data from a digital camera or other digital device. Next, the digital image is stored on a storage device associated with the image processing device. This digital image on the storage device is then converted into television signals compatible with a television receiver and supplied to a television for display.

Another aspect of the present invention provides an apparatus for processing digital images. This apparatus includes a first input terminal capable of receiving digital image data, a second input terminal capable of receiving commands from a user, an output terminal capable of supplying digital image data to a television receiver external to the apparatus, a storage device associated with the apparatus capable of storing the digital image data, and a processor capable of executing instructions in response to commands received over the second input terminal that store the received digital image in the storage device and transmit the stored digital image to the television receiver for display thereon.

BRIEF DESCRIPTION OF THE DRAWINGS

The accompanying drawings, which are incorporated in and constitute a part of this specification, illustrate systems and methods consistent with the invention and, together with the description, serve to explain the advantages, and principles of the invention.

In the drawings.

ONE EMBODIMENT FOR CARRYING OUT THE INVENTION

Digital Photography System

Figure 1:
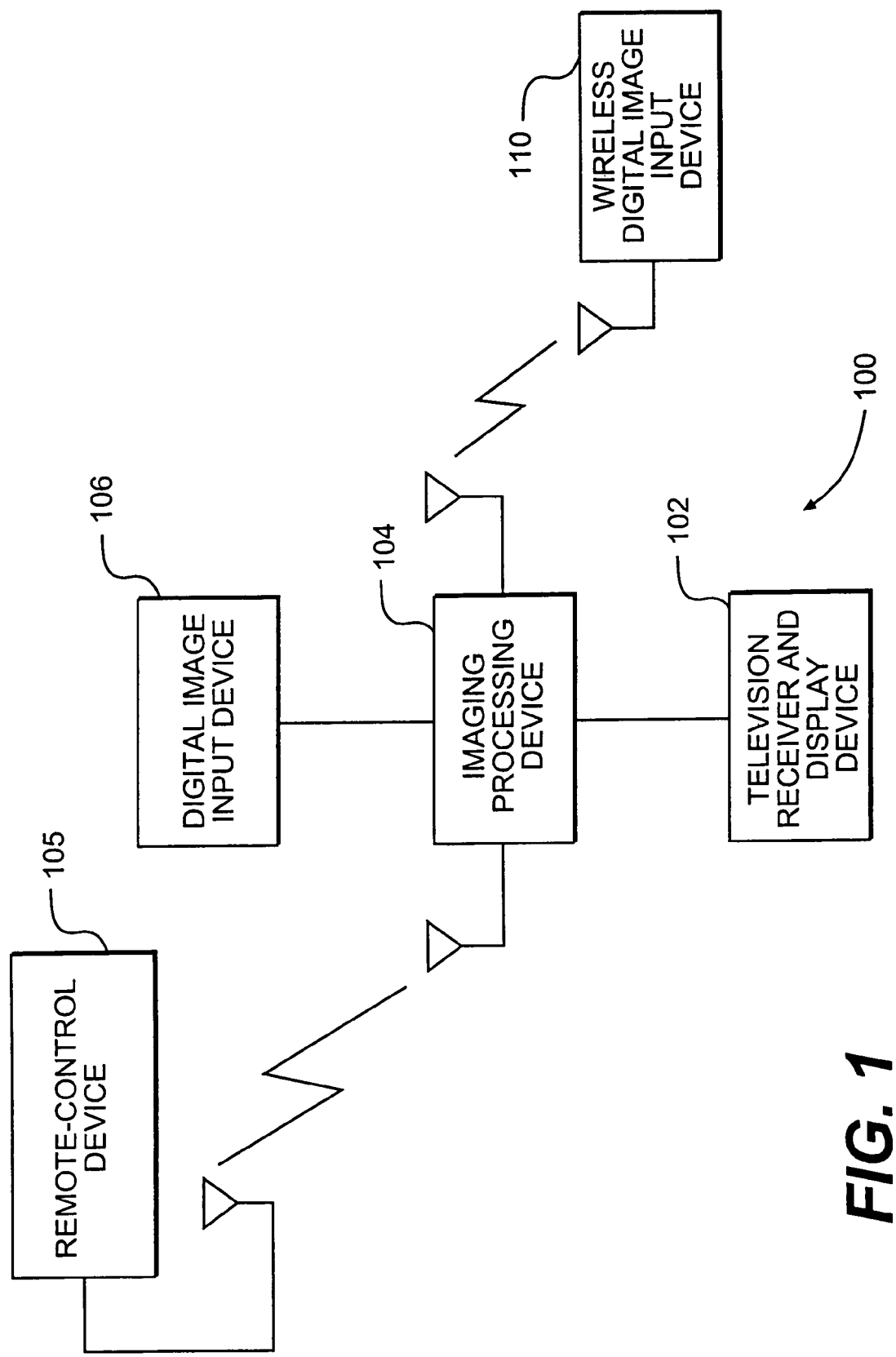
FIG. 1 is a block diagram of an digital photography system used to display digital images.

FIG. 1 is a block diagram of an digital photography system 100 used to display digital images. Digital photography system 100 includes a conventional television receiver 102, an imaging processing device 104, a remote-control device 105, a digital image input device 106, and a wireless digital image input device 110. Television receiver 102 has a receiver section compatible with conventional broadcast signals such as NTSC, DTV (Digital television), and PAL type television signals. Each television receiver 102 also includes a display portion for displaying images.

Image processing device 104 is a set-top box device designed in accordance with the present invention that provides digital images to television receiver 102 in a format compatible with NTSC, DTV, PAL, or any other format used to display images on a television. An output terminal on device 104 connects to a standard video input terminal on television 102. Alternatively, device 104 can be connected to television 102 using a wireless connection. The wireless connection enables device 104 to broadcast images to one or more televisions in a nearby area without physical cabling. This is advantageous for families with multiple televisions. Image processing device 104 can receive digital images from image capture devices over a first input terminal having a wireless connection, a physical connection, or a combination of both. Images can be stored on a storage device within image processing device 104. A second input terminal on image processing device 104 receives commands from remote-control device 105.

Digital image input device 106 can be a digital camera, a digital video camera, or any other device image capture device that produces digital image data. The connection between digital image input device 106 and imaging processing device 104 may be a universal serial bus (USB), IEEE-1394 ("Firewire"), or any other type of communication link having a standard physical interface.

Wireless digital image input device 110 can also be an image capture device that uses a wireless connection to imaging processing device 104 rather than a physical connection. For example, the communication link between digital image input device 106 may perform wireless communication using such protocol stacks as established by the Infra-red Data Association (IrDA). These communication links may also include radio frequency (RF) type communications. Images transferred to imaging processing device 104 can be processed using various image processing routines before being displayed.

Remote-control device 105 facilitates entering commands into image processing device 104 to process digital images. A wireless communication link transmits commands between remote-control device 105 and image processing device 104. A directional button on remote-control device 105 allows a user to move a cursor, a pointer, or other symbolic pointing element around on a menu displayed on the display of television receiver 102. The user selects menu options provided on the display using the directional button in conjunction with the symbolic pointing element. In additional an alpha-numeric keypad on remote-control device 105 allows the user to also enter alpha-numeric values for selecting, naming, and operating on images.

Figure 2:
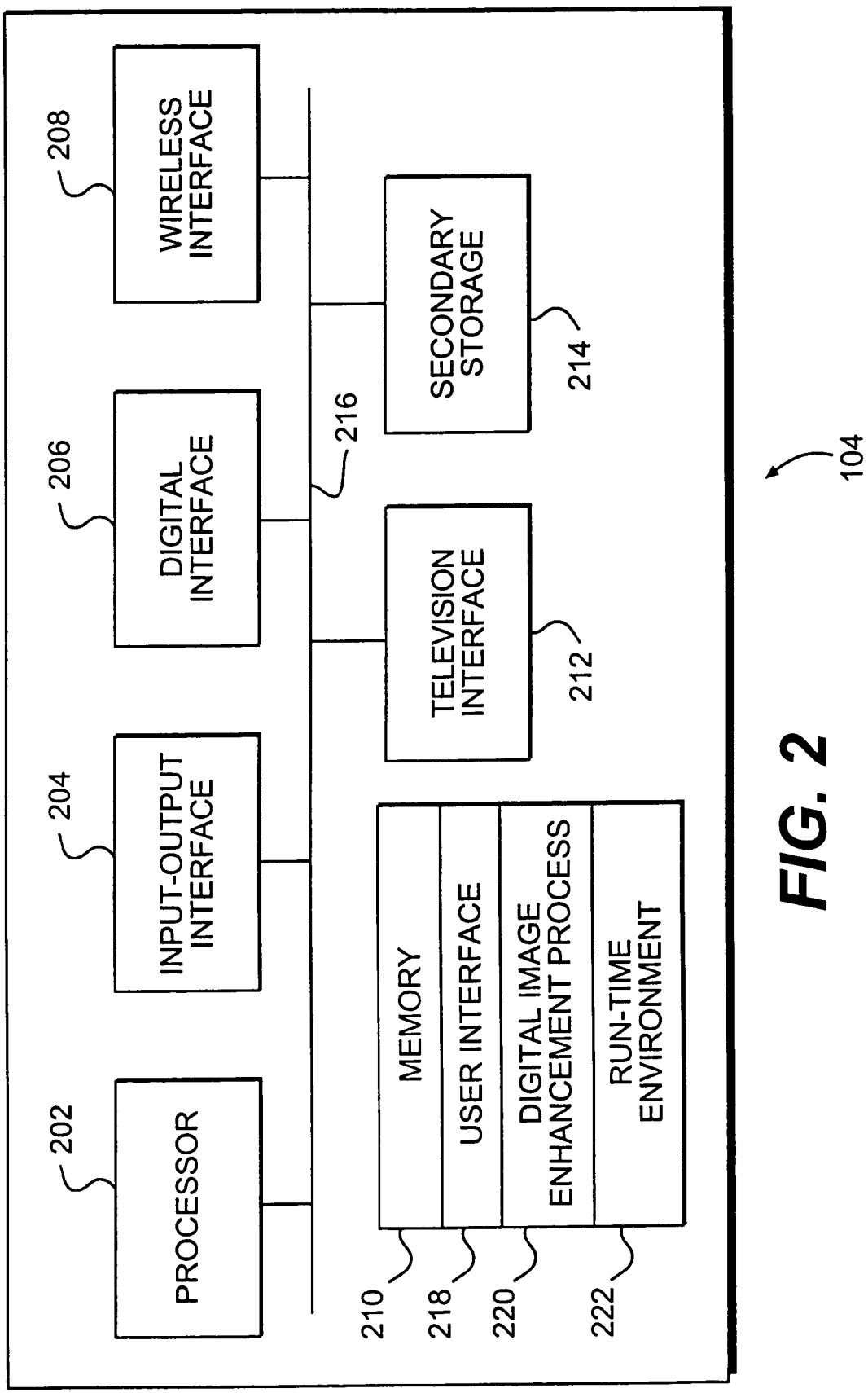
FIG. 2 is a block diagram illustration of components within a imaging processing device designed in accordance with one implementation of the present invention.

FIG. 2 is a block diagram illustration of components within imaging processing device 104 designed in accordance with one implementation of the present invention. Imaging processing device 104 includes a processor 202, an input-output interface 204, a digital interface 206, a wireless interface 208, memory 210, television interface 212, and a secondary storage 214, coupled together over an internal bus 216.

Processor 202 can be a general purpose processor such as an Intel Pentium processor or an application specific integrated circuit (ASIC) designed to execute an application designed in accordance with the present invention. Input-output interface 204 can be connected to a number of different peripheral devices such as a keyboard, a mouse, an external storage device, or a printer.

Digital interface 206 adheres to a digital standard such as the IEEE-1394 digital serial interface or USB. Devices using the digital interface may be less expensive and faster because they do not need analog to digital converters and bypass the additional analog processing. In particular, digital interface 206 may receive digital images from a digital camera. Wireless interface 208 receives information through infrared or radio frequency (RF) communications thus obviating cables or other special equipment. Television interface 212 couples the imaging processing device 104 to television receiver 102 providing a conduit for supplying images in NTSC, PAL, DTV or other formats compatible with the television receiver 102. Secondary storage 214 includes a hard disk, memory, or any other storage medium capable of storing images to be processed by imaging processing device 104.

Memory 210 includes a user interface 218, a digital image enhancement process 220, and a run-time environment 222. User interface 218 enables a user to display images on television receiver 102 and control the processing of images. An easy-to-use set of menu selections on user interface 218 facilitates receiving, storing, selecting, viewing, and transmitting through electronic mail the various digital images. Operating a remote control device, a user can select to display this menu system on the display of television receiver 102 while optionally blocking out other television or video signals. Alternatively, the menu system may automatically appear on the display when imaging processing device 104 receives power. For example, menu selections on user interface 218 may have selectable buttons labeled to store, retrieve, and delete images stored on secondary storage 214. In addition, user interface 218 may include advanced features for processing images with image processing routines such as edge sharpening, image softening, image cropping, and other image enhancements.

Digital image enhancement process 220 provides software routines for performing the above mentioned image enhancement routines as well as routines for compression, decompression, and formatting of data. For example, digital image enhancement process 220 includes routines for processing JPEG, MPEG, TIF, GIF, and other image formats typically used to display images known to those skilled in the art. Digital image enhancement process 220 also includes the ability to incorporate additional routines for processing other types of image data. For example, new formatting and compression routines can be downloaded through digital interface 206 to upgrade the digital image enhancement process 220.

Run-time environment 222 facilitates execution on processor 202 of software processes located in memory 210 discussed above. Different run-time environments 222 compatible with implementations of the present invention include real-time operating systems (RTOS) for real-time processing, UNIX-based operating systems, or Microsoft Windows. Run-time environment 222 also includes drivers and other routines necessary for input-output interface 204, digital interface 206, wireless interface 208, and television interface 212 to receive and transmit data.

Figure 3:
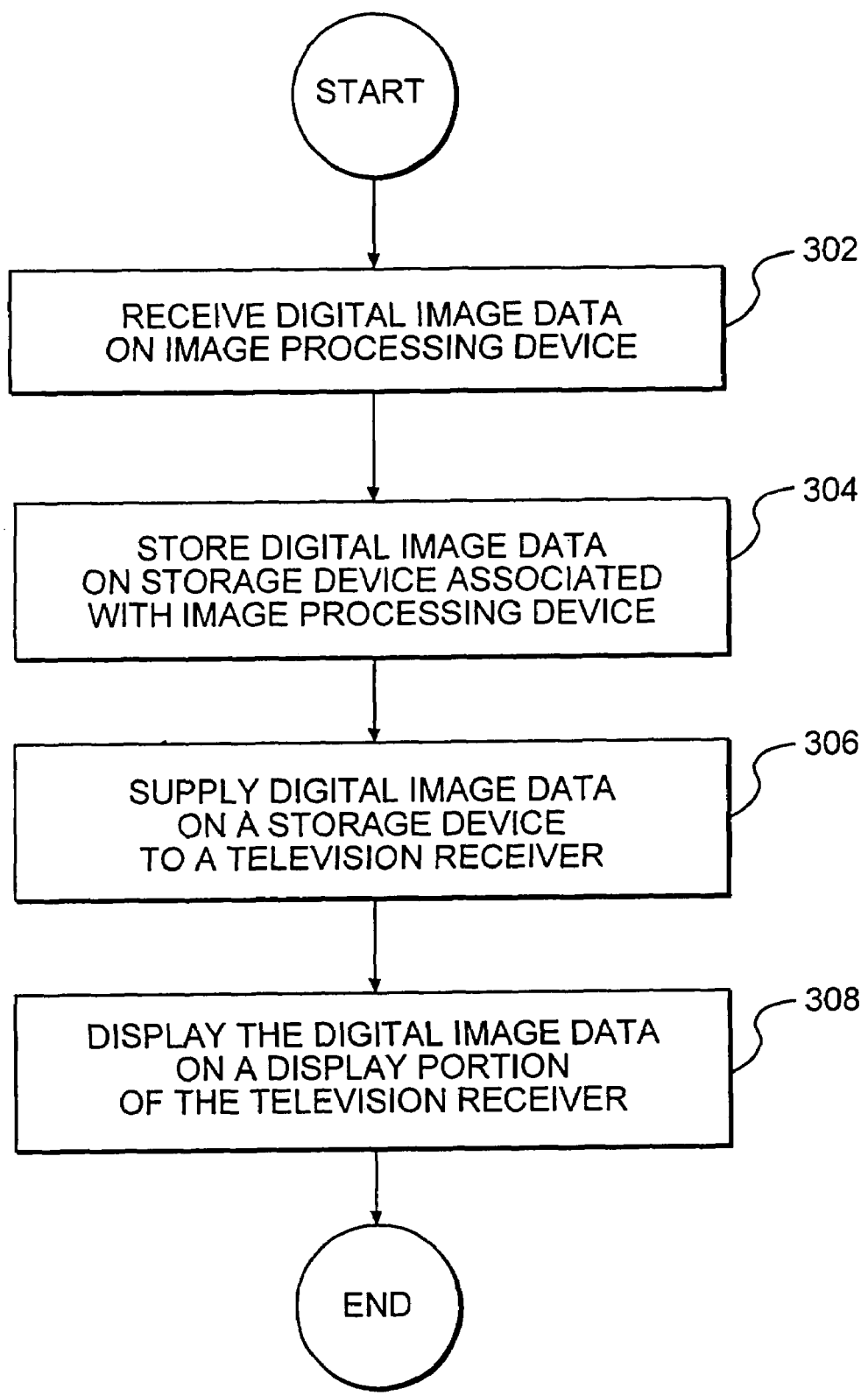
FIG. 3 is a flowchart diagram indicating the stages used to display digital images on television receiver.

FIG. 3 is a flowchart diagram indicating the stages used to display digital images on television receiver 102. Initially, a user connects a digital image input device such as a camera or video camera to image processing device 104. The user configures television receiver 102 to receive signals from the image processing device 104. Using either a wireless connection or a physical connection, imaging processing device 104 then receives digital image data (stage 302). Next, imaging processing device 104 stores digital image data on a storage device associated with imaging processing device 104 (stage 304). Television receiver 102 then receives digital image data from imaging processing device 104 (stage 306). Imaging processing device 104 converts the digital image data into television signals compatible with television receiver 102 such as NTSC, PAL, or DTV formats. Once properly converted, these signals are transmitted to television receiver 102 for display on the display portion of the television receiver (stage 308). By using imaging processing device 104, digital images can be displayed without a computer.

While specific embodiments have been described herein for purposes of illustration, various modifications may be made without departing from the spirit and scope of the invention. Further, although aspects of the present invention are described as being stored in memory and other storage mediums, one skilled in the art will appreciate that these aspects of the present invention can also be stored on or read from other types of computer-readable media, such as secondary storage devices, like hard disks, floppy disks, or CD-ROM; a carrier wave from the Internet, or other forms of RAM. Accordingly, the invention is not limited to the above described embodiments, but instead is defined by the appended claims in light of their full scope of equivalents.

The invention claimed is:

1. A method comprising the act of:
   providing a process comprising machine-readable instructions;
   wherein the process receives an image as digital data captured by a camera;
   wherein the process comprises a first image processing routine that enhances a first aspect of the received image in response to a first image processing command;

wherein the process is upgradeable to receive a second image processing routine that enhances a second aspect of the received image in response to a second image processing command; and wherein the process outputs the enhanced received image as data suitable for display on a television.

2. The method of claim 1, wherein the received image comprises a still picture.

3. The method of claim 1, wherein the received image comprises a moving picture.

4. The method of claim 1, wherein the process receives the image via a wired connection.

5. The method of claim 1, wherein the process receives the image via a wireless connection.

6. The method of claim 1, wherein the process outputs the enhanced received image via a wired connection.

7. The method of claim 1, wherein the process outputs the enhanced received image via a wireless connection.

8. The method of claim 1 wherein the process outputs the enhanced received image as data suitable to be received by a data storage device.

9. The method of claim 8, wherein the data storage device comprises a disk storage medium.

10. The method of claim 1, wherein the process outputs the enhanced received image as data suitable to be received by a printer.

11. The method of claim 1, wherein the process outputs the enhanced received image in an electronic mail transmission.

12. The method of claim 1, wherein the process outputs the enhanced received image in response to a wireless command.

13. A method comprising the acts of:
receiving an image as digital data captured by a camera;
executing a first routine that enhances a first aspect of the received image in response to a first image processing command;
receiving an upgrade routine that enhances a second aspect of the received image in response to a second image processing command; and
outputting the enhanced received image as data suitable for display on a television.

14. The method of claim 13, wherein the data suitable for display on the television is embodied in an analog signal.

15. The method of claim 13, wherein the data suitable for display on the television is embodied in a digital signal.

16. The method of claim 13, wherein the received image comprises a still picture.

17. The method of claim 13, wherein outputting the enhanced received image comprises transmitting electronic mail.

18. A method comprising the acts of:
receiving an image as digital data captured by a camera;
storing the received image on a storage device comprising a disk;
executing a first routine that enhances a first aspect of the stored received image in response to a first image processing command;
receiving an upgrade routine that enhances a second aspect of the stored received image in response to a second image processing command; and
outputting the enhanced received image as data suitable for display on a television.

19. The method of claim 18, wherein the data suitable for display on the television is embodied in an analog signal.

20. The method of claim 18, wherein the data suitable for display on the television is embodied in a digital signal.

21. The method of claim 18, wherein the received image comprises a still picture.

22. The method of claim 18, wherein outputting the enhanced received image comprises transmitting electronic mail.

23. A method comprising the acts of:
receiving an image as digital data captured by a camera;
executing a first routine that enhances a first aspect of the received image in response to a first image processing command;
receiving an upgrade routine that enhances a second aspect of the received image in response to a second image processing command;
storing the enhanced received image on a storage device comprising a disk; and
outputting the stored enhanced received image as data suitable for display on a television.

24. The method of claim 23, wherein the data suitable for display on the television is embodied in an analog signal.

25. The method of claim 23, wherein the data suitable for display on the television is embodied in a digital signal.

26. The method of claim 23, wherein the received image comprises a still picture.

27. The method of claim 23, wherein outputting the stored enhanced received image comprises transmitting electronic mail.

28. An image display system comprising:
a camera;
an image processing system; and
a television;
wherein the image processing system receives an image as digital data captured by the camera;
wherein the image processing system comprises a first image processing routine that enhances a first aspect of the received image in response to a first image processing command;
wherein the image processing system is upgradeable to receive a second image processing routine that enhances a second aspect of the received image in response to a second image processing command; and
wherein the image processing system outputs the enhanced received image as data suitable for display on the television.

29. The system of claim 28, wherein the received image comprises a still picture.

30. The system of claim 28, wherein the received image comprises a moving picture.

31. The system of claim 28, wherein the processing system receives the image via a wired connection.

32. The system of claim 28, wherein the processing system receives the image via a wireless connection.

33. The system of claim 28, wherein the processing system outputs the enhanced received image via a wired connection.

34. The system of claim 28, wherein the processing system outputs the enhanced received image via a wireless connection.

35. The system of claim 28, wherein the processing system outputs the enhanced received image as data suitable to be received by a data storage device.

36. The system of claim 35, wherein the data storage device comprises a disk storage medium.

37. The system of claim 28, wherein the processing system outputs the enhanced received image as data suitable to be received by a printer.

38. The system of claim 28, wherein the processing system outputs the enhanced received image as electronic mail.

39. The system of claim 28, wherein the processing system outputs the enhanced received image in response to a wireless command.

40. An image processing system comprising;
a display device for displaying image data received from an image capture device; and
a data processing system, coupled to the display device, comprising:
an input port for receiving commands to process the displayed image data, and
a processor for executing, in response to the commands, an image enhancement routine to enhance a first aspect of the displayed image data, wherein the image enhancement routine is selected from an upgradeable enhancement process operable to receive at least one additional enhancement routine for enhancing a second aspect of the displayed image data.

41. The system of claim 40, wherein the image enhancement routine comprises one of an edge sharpening routine, an image softening routine, an image cropping routine, a compression routine, a decompression routine, and a formatting routine.

42. The system of claim 40 further comprising an output port for outputting the enhanced image data for additional processing.

43. The system of claim 42, wherein the output port outputs the enhanced image data to a storage device.

44. The system of claim 42, wherein the output port outputs the enhanced image data to a printing device.

45. The system of claim 40, wherein the image capture device comprises a digital still camera.

46. The system of claim 40, wherein the image capture device comprises a digital video camera.

47. The system of claim 40, wherein the display device comprises a television.

48. An image processing system comprising;
a display device for displaying image data received from an image capture device; and
a data processing module, coupled to the display device, comprising:
a user interface for displaying an image enhancement option;
an input port for receiving a command that selects the image enhancement option;
a processor for performing the selected image enhancement option by executing, in response to the command, an image enhancement routine that enhances a first aspect of the displayed image data, the image enhancement routine being selected from an upgradeable enhancement process operable to receive an additional enhancement routine for enhancing an additional aspect of the displayed image data; and
an output port for outputting the enhanced image data to a peripheral device.

49. The system of claim 48, wherein the peripheral device comprises a storage device.

50. The system of claim 48, wherein the peripheral device comprises a printing device.

51. The system of claim 48, wherein the image capture device comprises a digital still camera.

52. The system of claim 48, wherein the image capture device comprises a digital video camera.

53. The system of claim 48, wherein the display device comprises a television.

54. An image processing system comprising:
a display device including a port for interfacing with an image capture device, the display device configured to receive image data from the image capture device and display the image data; and
a data processing module, coupled to the display device, comprising:
an input port for receiving commands to process the displayed image data, and
a processor for executing, in response to the commands, an image enhancement routine to enhance a first aspect of the displayed image data, wherein the image enhancement routine is selected from an upgradeable enhancement process operable to receive at least one additional enhancement routine for enhancing a second aspect of the displayed image data.

55. The system of claim 54, wherein the image capture device comprises a digital still camera.

56. The method of claim 54, wherein the image capture device comprises a digital video camera.

57. The system of claim 54, wherein the display device comprises a television.

58. The system of claim 54, wherein the image enhancement routine comprises one of an edge sharpening routine, an image softening routine, an image cropping routine, a compression routine, a decompression routine, and a formatting routine.

59. An apparatus for processing images comprising:
a first input terminal for receiving image data in a first format;
a second input terminal for receiving image processing commands;
a storage device associated with the apparatus for storing the image data; and
a processor configured to:
store the received image data on the storage device,
execute, in response to the image processing commands, instructions included in an upgradeable image enhancement process for processing the image data so as to enhance the image data, and
output the enhanced image data.

60. The apparatus of claim 59, wherein the processor executes instructions for performing at least one of edge sharpening, image softening, image cropping, compression, decompression, and formatting.

61. The apparatus of claim 59, wherein the first input terminal receives the image data from a digital camera.

62. The apparatus of claim 59, wherein the first input terminal receives the image data from a digital video camera.

63. The apparatus of claim 59, wherein the storage device includes memory elements capable of storing the image data.

64. The apparatus of claim 59, wherein the processor outputs the image data to a display apparatus via a wireless transmission medium.

65. The apparatus of claim 64, wherein the display apparatus comprises a television.

66. The apparatus of claim 59, wherein the processor outputs the image data to a display apparatus via digital serial transmission medium.

67. The apparatus of claim 66, wherein the display apparatus comprises a television.

68. The apparatus of claim 59, wherein the second input terminal receives the image processing commands via a wireless link from a remote-control device.

* * * * *